US012591534B2

(12) United States Patent (10) Patent No.: US 12,591,534 B2

Kallickal et al. (45) Date of Patent: Mar. 31, 2026

(54) APPARATUSES, COMPUTER-IMPLEMENTED METHODS, AND COMPUTER PROGRAM PRODUCTS FOR CONNECTED DEVICE CONTROL AND USE

(71) Applicant: Hand Held Products, Inc., Charlotte, NC (US)

(72) Inventors: Melwyn Thomas Kallickal, Charlotte, NC (US); Charles Joseph Cunningham, IV, Charlotte, NC (US); Glenn David Aspenns, Charlotte, NC (US); Changbo Tang, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 125 days.

(21) Appl. No.: 18/525,011

(22) Filed: Nov. 30, 2023

(65) Prior Publication Data

US 2024/0202152 A1 Jun. 20, 2024

(30) Foreign Application Priority Data

Dec. 14, 2022 (CN) .......................... 202211601805.2

(51) Int. Cl.
*G06F 13/38* (2006.01)
*G06F 13/42* (2006.01)

(52) U.S. Cl.
CPC ........ *G06F 13/382* (2013.01); *G06F 13/4282* (2013.01); *G06F 2213/0042* (2013.01)

(58) Field of Classification Search
CPC ................................................ G06F 2213/0042
See application file for complete search history.

(56) References Cited

U.S. PATENT DOCUMENTS

| | | | | |
|---|---|---|---|---|
| 7,502,878 | B1 * | 3/2009 | Wright | G06F 13/4022 |
| | | | | 710/37 |
| 9,965,424 | B2 * | 5/2018 | Maung | G06F 13/4022 |

(Continued)

FOREIGN PATENT DOCUMENTS

| | | | | |
|---|---|---|---|---|
| WO | 2016/043693 A1 | 3/2016 | | |
| WO | WO-2020056489 A1 * | 3/2020 | | G06F 1/266 |

OTHER PUBLICATIONS

EP Office Action Mailed on Dec. 11, 2024 for EP Application No. 23208493, 4 page(s).

(Continued)

*Primary Examiner* — Henry Tsai
*Assistant Examiner* — Juanito C Borromeo
(74) *Attorney, Agent, or Firm* — Alston & Bird LLP

(57) ABSTRACT

In accordance with example embodiments provided herein is a computer-implemented methods, apparatuses and computer program products configured to enable the ambidextrous use of a device. In some examples, a method is disclosed that includes detecting a connection to at least one of a first input/output port and a second input/output port. In some example embodiments, the method includes, in an instance in which a downstream peripheral is detected as being connected, communicating with the downstream peripheral via a hub communication path. In some example embodiments, the method includes, in an instance in which a USB host is detected as being connected, communicating with the USB host via a bypass communication path.

20 Claims, 7 Drawing Sheets

(56) References Cited

U.S. PATENT DOCUMENTS

| | | |
|---|---|---|
| 2010/0057946 A1 | 3/2010 | Crumlin et al. |
| 2015/0089092 A1 | 3/2015 | Voto et al. |
| 2016/0274163 A1* | 9/2016 | Yin ....................... G06F 13/385 |

OTHER PUBLICATIONS

Compaq Hewlett-Packard et al., "Universal Serial Bus Specification," Revision 2.0, 650 pages, (Apr. 27, 2020).
Extended European Search Report Mailed on Apr. 4, 2024 for EP Application No. 23208493, 8 page(s).

\* cited by examiner

102

104a

102

104b

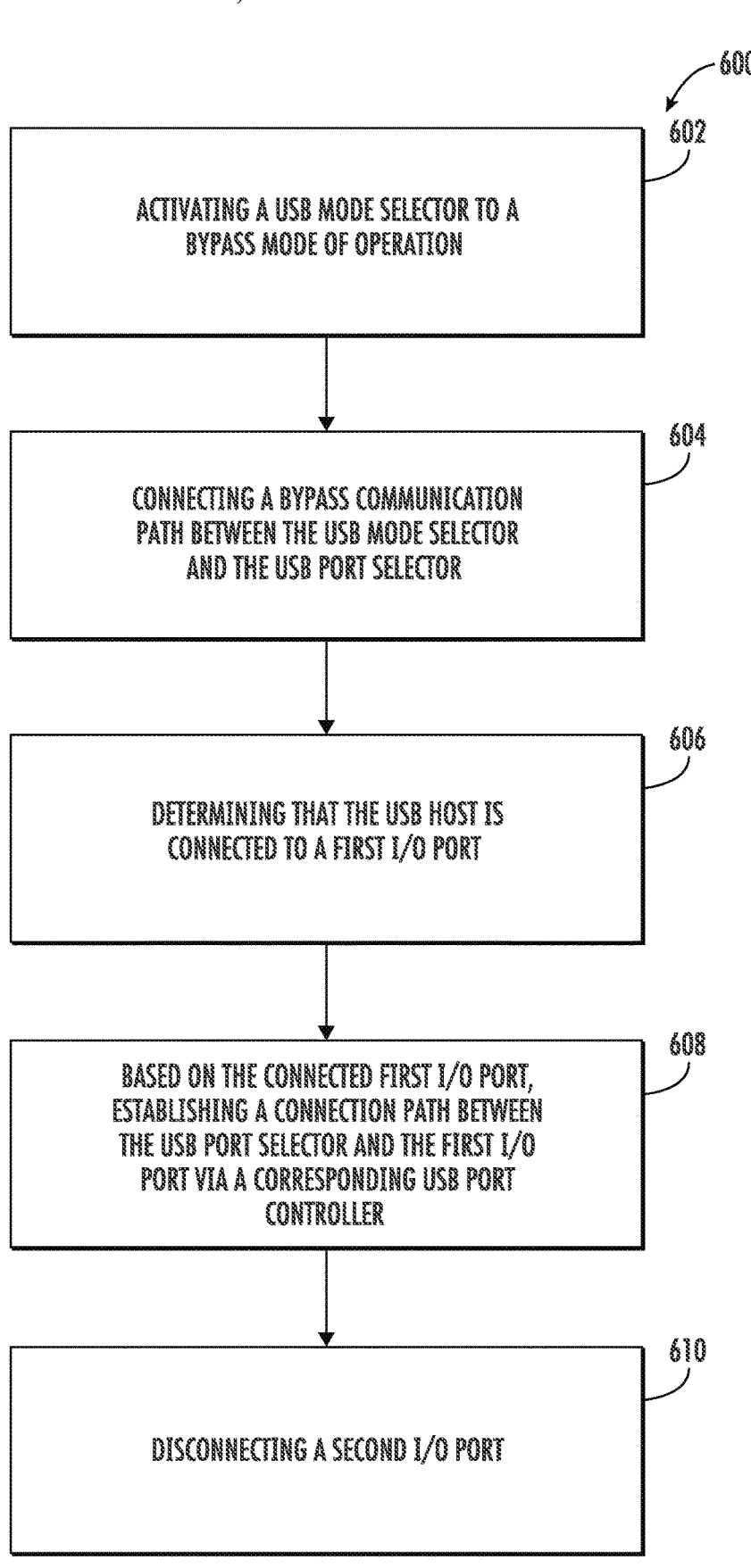

_600_

_602_

ACTIVATING A USB MODE SELECTOR TO A
BYPASS MODE OF OPERATION

_604_

CONNECTING A BYPASS COMMUNICATION
PATH BETWEEN THE USB MODE SELECTOR
AND THE USB PORT SELECTOR

_606_

DETERMINING THAT THE USB HOST IS
CONNECTED TO A FIRST I/O PORT

_608_

BASED ON THE CONNECTED FIRST I/O PORT,
ESTABLISHING A CONNECTION PATH BETWEEN
THE USB PORT SELECTOR AND THE FIRST I/O
PORT VIA A CORRESPONDING USB PORT
CONTROLLER

_610_

DISCONNECTING A SECOND I/O PORT

ACTIVATING A USB MODE SELECTOR TO A HUB
MODE OF OPERATION

704

CONNECTING A HUB COMMUNICATION PATH
BETWEEN THE USB SELECTOR AND THE
USB HUB

706

CONNECTING THE USB HUB TO AT LEAST ONE
OF THE FIRST I/O PORT AND THE SECOND I/O
PORT BASED ON THE DETECTION OF A
CONNECTED DOWNSTREAM PERIPHERAL

APPARATUSES, COMPUTER-IMPLEMENTED METHODS, AND COMPUTER PROGRAM PRODUCTS FOR CONNECTED DEVICE CONTROL AND USE

CROSS REFERENCE TO RELATED APPLICATIONS

This application claims priority pursuant to 35 U.S.C. 119(a) to Chinese Application No. 202211601805.2, filed Dec. 14, 2022, which application is incorporated herein by reference in its entirety.

TECHNOLOGICAL FIELD

Embodiments of the present disclosure generally relate the control of connected devices, and specifically to controlling connected devices based on a determination that the connected device is a downstream peripheral or an upstream host.

BACKGROUND

In various contexts, devices may be connected to a device, such as a mobile computer, a bar code decoder, or the like. In some examples, these devices may take the form of a downstream peripheral or an upstream host. However, the determination of which device is connected may impact how the device is controlled. Applicant has discovered problems with current implementations of connected device controllers. Through applied effort, ingenuity, and innovation, Applicant has solved many of these identified problems by developing embodied in the present disclosure, which are described in detail below.

BRIEF SUMMARY

In general, embodiments of the present disclosure are provided for connected device detection and control. Other implementations for connected device control and use will be, or will become, apparent to one with skill in the art upon examination of the following figures and detailed description. It is intended that all such additional implementations be included within this description be within the scope of the disclosure and be protected by the following claims.

In accordance with some example embodiments, provided herein is an apparatus. In some examples, the apparatus includes at least one processor and at least one memory including computer program code, the at least one memory and the computer program code configured to, with the at least one processor, cause the apparatus to at least detect a connection to at least one of a first input/output port and a second input/output port. In some example embodiments and in an instance in which a downstream peripheral is detected as being connected to the at least one of the first input/output port and the second input/output port, the at least one memory and the computer program code configured to, with the at least one processor, further cause the apparatus to at least communicate with the downstream peripheral via a hub communication path. In some example embodiments and in an instance in which a universal serial bus ("USB") host is detected as being connected to the at least one of the first input/output port and the second input/output port, the at least one memory and the computer program code configured to, with the at least one processor, further cause the apparatus to at least communicate with the USB host via a bypass communication path.

In accordance with some example embodiments, provided herein is a computer-implemented method. In some example embodiments, the method includes detecting a connection to at least one of a first input/output port and a second input/output port. In some example embodiments, the method includes, in an instance in which a downstream peripheral is detected as being connected to the at least one of the first input/output port and the second input/output port, communicating with the downstream peripheral via a hub communication path. In some example embodiments, the method includes, in an instance in which a USB host is detected as being connected to the at least one of the first input/output port and the second input/output port, communicating with the USB host via a bypass communication path.

In accordance with some example embodiments, provided herein is a computer program product comprising at least one non-transitory computer-readable storage medium having computer-readable program code portions stored therein, the computer-readable program code portions comprising an executable portion configured to detect a connection to at least one of a first input/output port and a second input/output port. In some example embodiments and in an instance in which a downstream peripheral is detected as being connected to the at least one of the first input/output port and the second input/output port, the computer-readable program code portions comprising an executable portion are further configured to communicate with the downstream peripheral via a hub communication path. In some example embodiments and in an instance in which a USB host is detected as being connected to the at least one of the first input/output port and the second input/output port, the computer-readable program code portions comprising an executable portion are further configured to communicate with the USB host via a bypass communication path.

BRIEF DESCRIPTION OF THE DRAWINGS

Figure 1A:
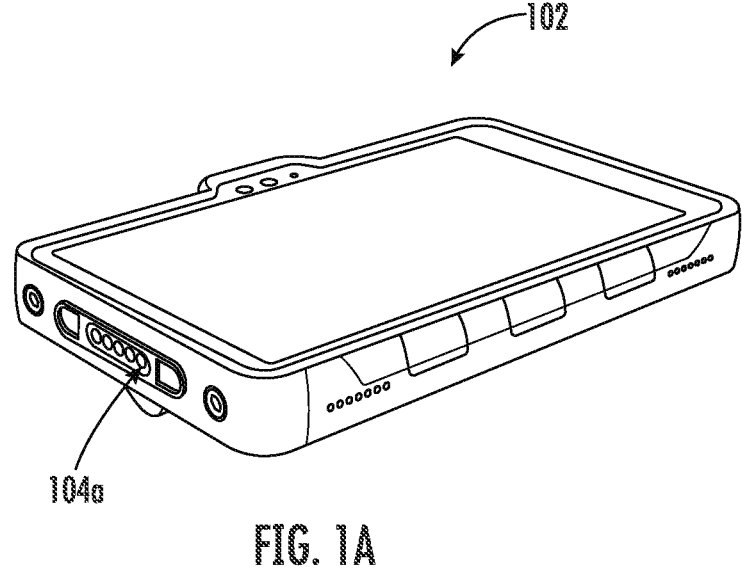
Figure 1B:
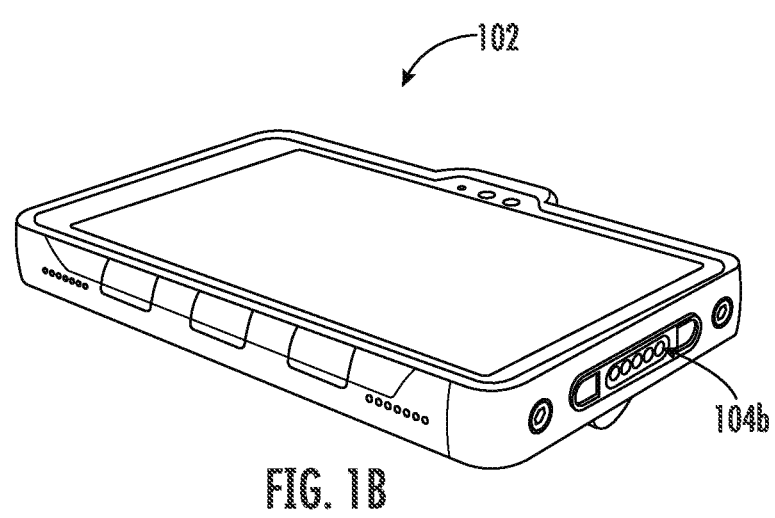
Figure 2:
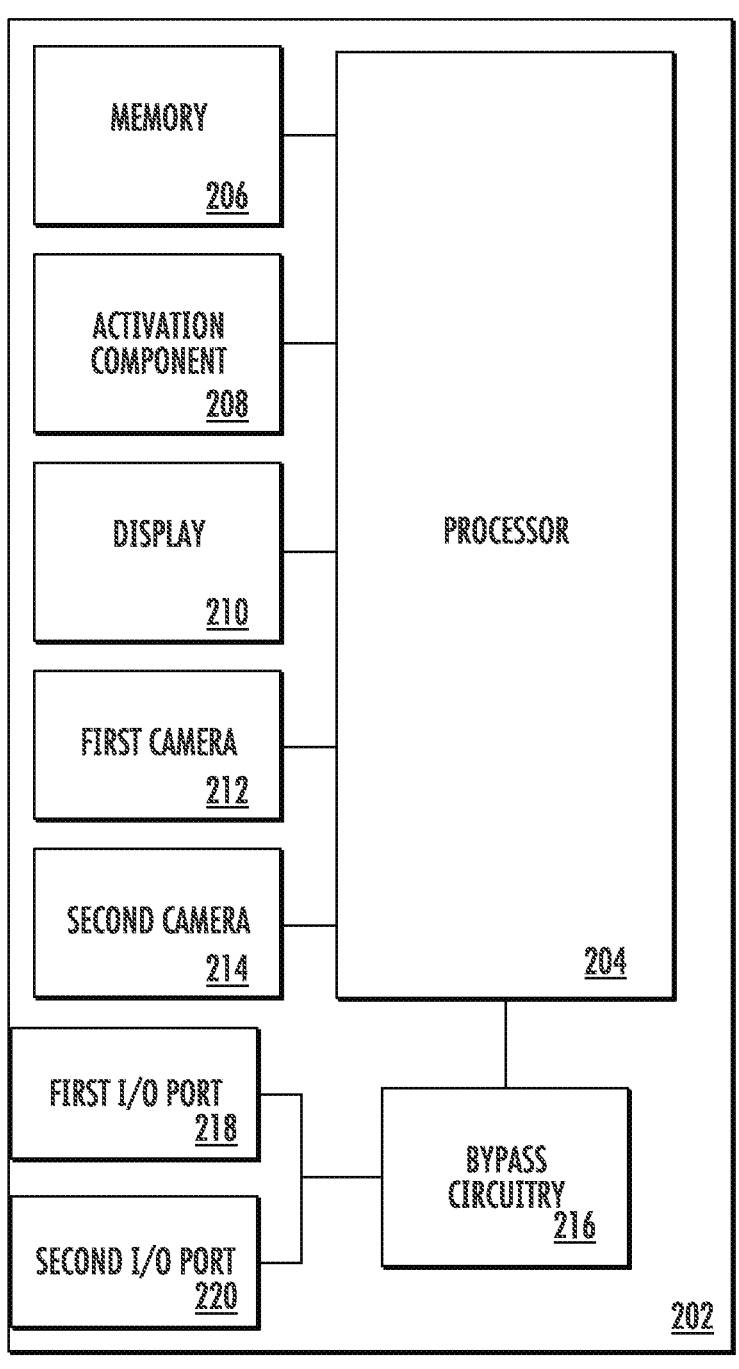
Figure 3:
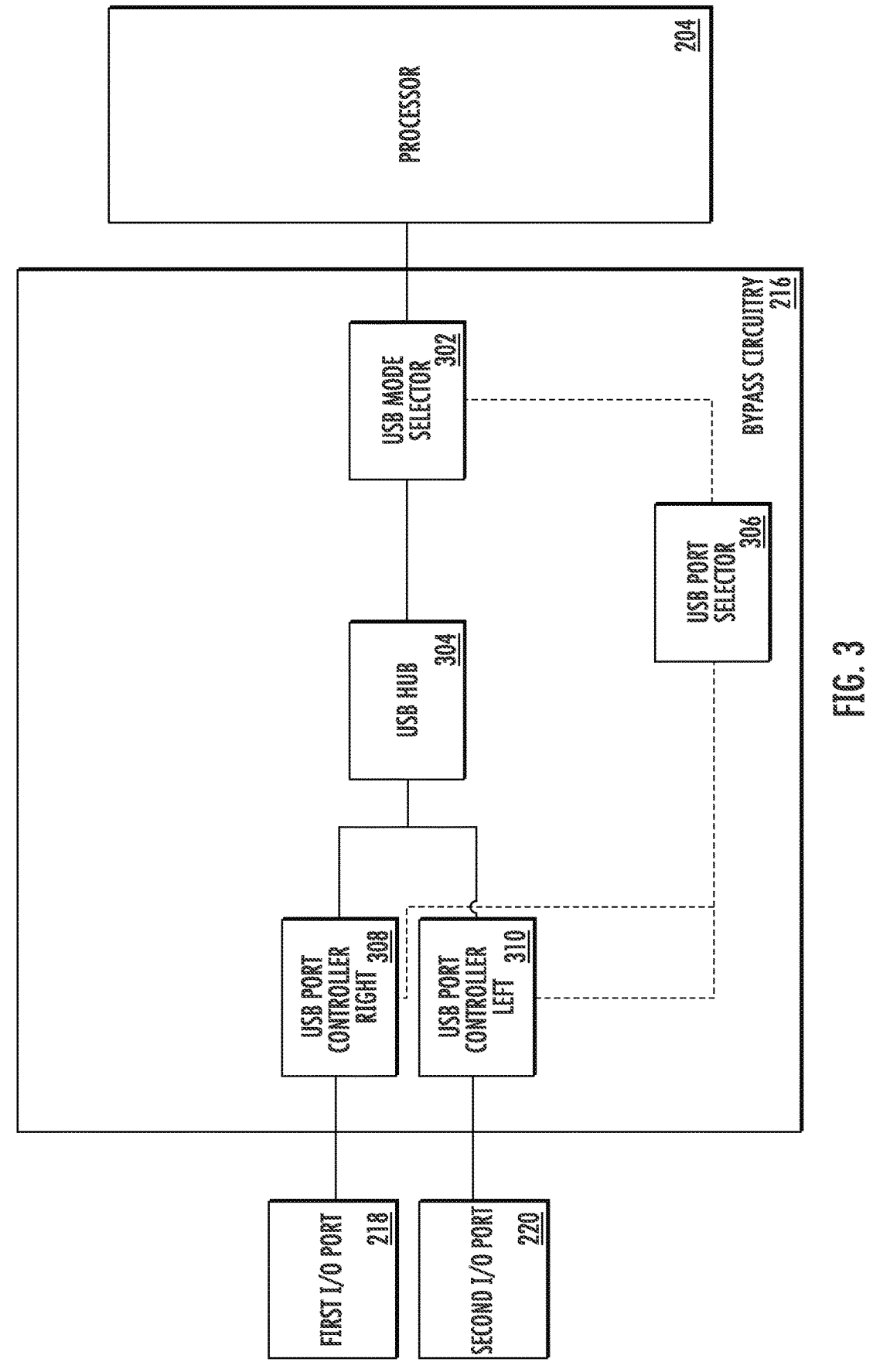
Figure 4:
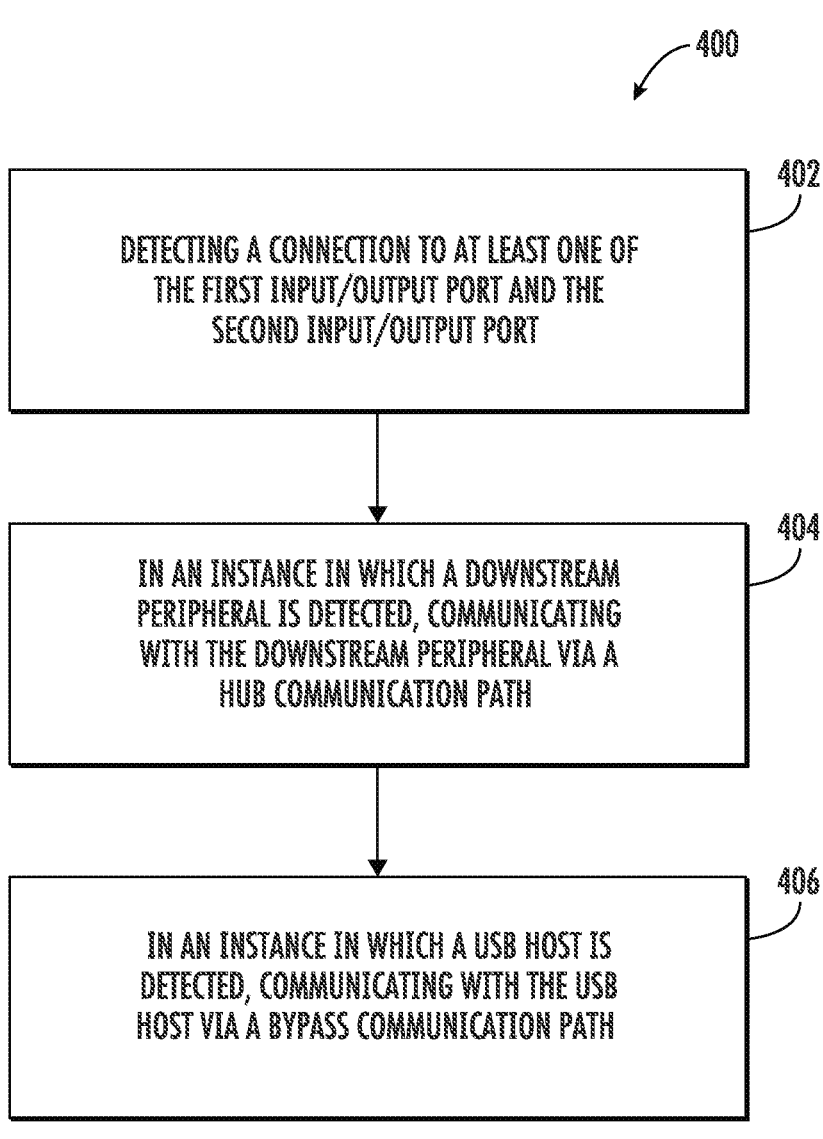
Figure 5:
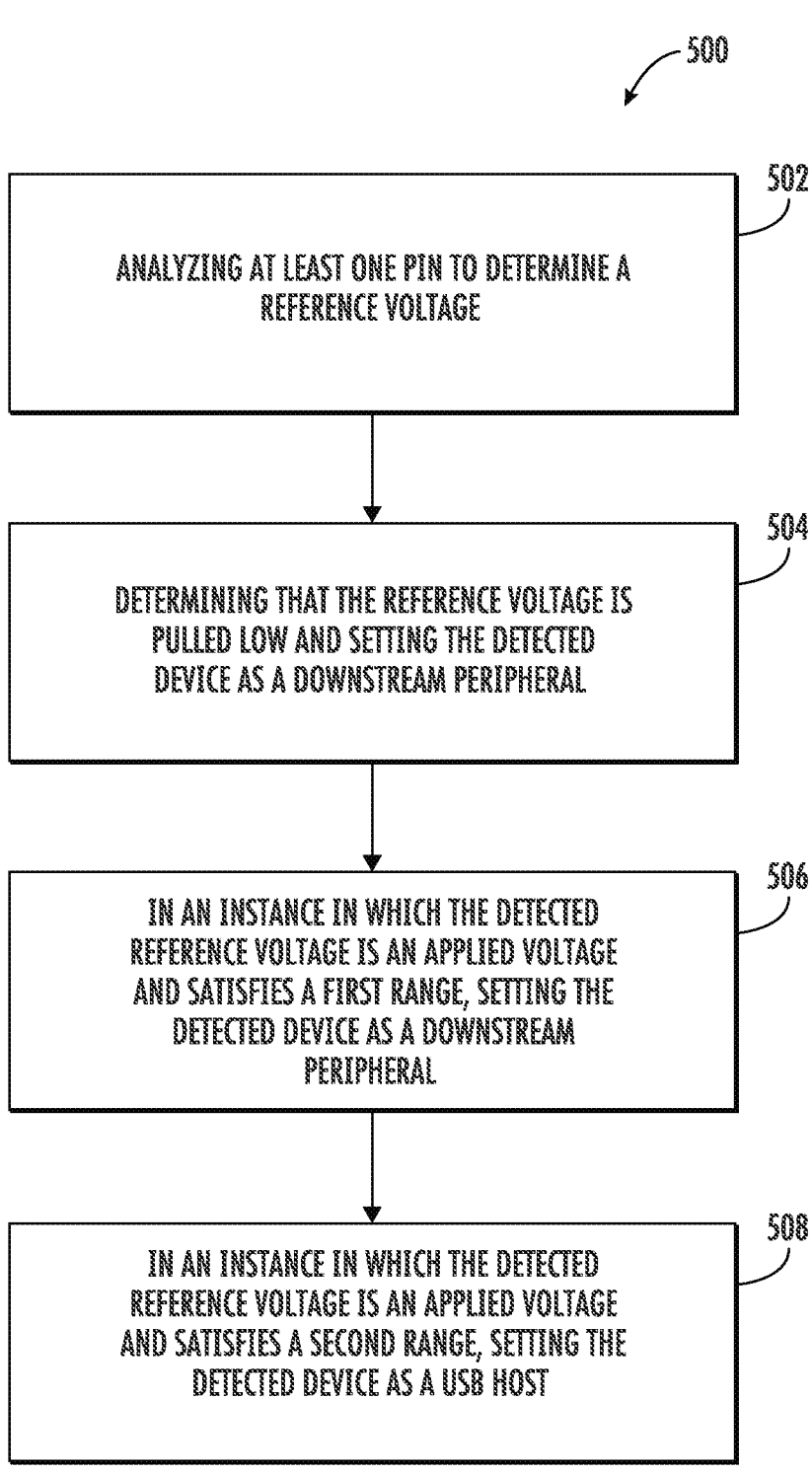
Figure 7:
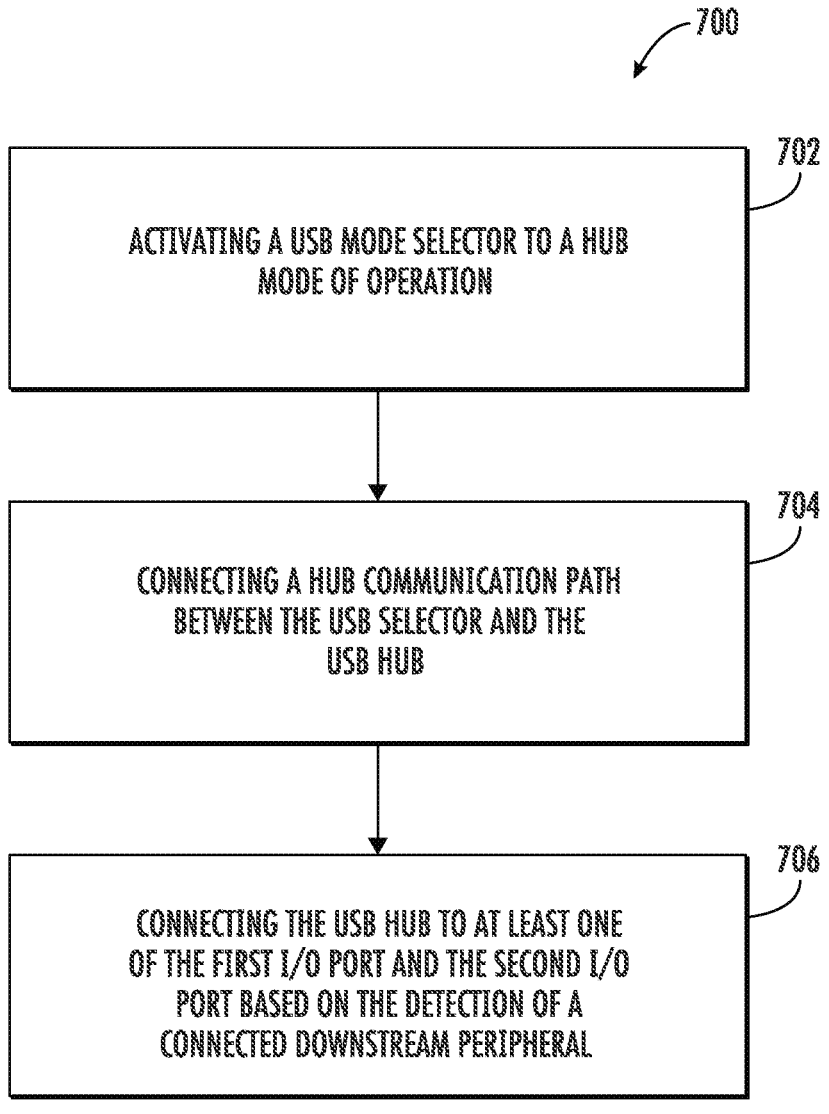

Having thus described the embodiments of the disclosure in general terms, reference now will be made to the accompanying drawings, which are not necessarily drawn to scale, and wherein:

FIGS. 1A and 1B illustrate a scanning apparatus in accordance with at least one example embodiment of the present disclosure;

FIG. 2 illustrates an example scanning apparatus in accordance with at least one example embodiment of the present disclosure;

FIG. 3 illustrates example bypass circuitry in accordance with at least one example embodiment of the present disclosure;

FIG. 4 illustrates an example process for determining at least one device is connected to an I/O port, in accordance with at least one example embodiment of the present disclosure;

FIG. 5 illustrates an example process for identifying the type or classification of the at least one device that is connected to an I/O port, in accordance with at least one example embodiment of the present disclosure;

FIG. 6 illustrates an example process for connecting a bypass communication path, in accordance with at least one example embodiment of the present disclosure; and FIG. 7 illustrates an example process for connecting a hub communication path, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, a device, such as a mobile computer, terminal, barcode scanner, scanning apparatus and/or the like, may be connected to one or more connected devices, such as a downstream USB scanner, a downstream USB keypad, and/or an upstream USB host. In some examples, the connected devices may take the form of an upstream device, such as a host device. In other examples, the connected devices, may take the form of a downstream device, such as a peripheral (e.g., USB scanner, USB keypad, etc.). In some examples, a mechanism (e.g., a communication path, a protocol, and/or the like) for communicating with one or more connected devices may be different based on whether the connected device is an upstream device or a downstream device.

Further, in some examples, individual ports may be identified as an upstream or downstream port. That is, a particular port may be designated as either a port for upstream devices or a port for downstream devices. However, in some examples, a device, such as a mobile computer, terminal, barcode scanner, scanning apparatus and/or the like, may allow for a particular port to support both upstream and downstream devices (e.g., dual purpose use of each I/O port). In some example, a port that supports both upstream and downstream devices may support ambidextrous mounting and/or operation.

The inventors have identified, in some examples, various arrangements for a device, such as a terminal, barcode scanner, scanning apparatus and/or the like, so as to allow for advantageous ambidextrous use, in some examples. That is, a device, such as a terminal, barcode scanner, scanning apparatus and/or the like that allows for at least one I/O port on either side of the device so as to allow a connection of a device when worn or otherwise operated. As a result, an operator may attach connected devices to either side of the worn device, such as a terminal, barcode scanner, scanning apparatus and/or the like, where the connected device is the host and the device, such as a terminal, barcode scanner, scanning apparatus and/or the like is the client as well as where the device, such as a terminal, barcode scanner, scanning apparatus and/or the like is the host and the connected peripheral(s) is the client. As a result, embodiments herein enable ambidextrous use of a worn device, such as a terminal, barcode scanner, scanning apparatus and/or the like.

Embodiments of the present disclosure, in some examples, rely on an integrated USB hub along with a bypass communication path to enable dual purpose I/O ports. In one example embodiment, terminal pins of the one or more dual purpose I/O ports (e.g., a first I/O port and a second, I/O port) are monitored and a reference voltage is measured so as to detect either an upstream host or a downstream peripheral. For example, and in an instance in which an upstream host is detected, an integrated USB hub is bypassed via a bypass communication path between a processor and an I/O port. By way of further example and in an instance in which a downstream peripheral is detected the processor communicates with the peripheral via the USB hub.

Example Apparatuses of the Disclosure

FIGS. 1A and 1B illustrate a scanning apparatus 102 in accordance with at least one example embodiment of the present disclosure. The scanning apparatus 102 is configured for capturing one or more images of a target in one or more fields of views using one or more illumination sources. The scanning apparatus 102 processes the one or more images to execute one or more image processing tasks such as indicia reading. Accordingly, in some example embodiments of the disclosure, the scanning apparatus 102 may be embodied in part or full as an indicia or symbol reader or a handheld device capable of reading indicia and similar symbols. Alternatively or additionally, scanning apparatus 102 may take the form of a mobile computer, personal computer, wearable or the like, and may be connected to a device that is configured as an indicia or symbol reader or a handheld device capable of reading indicia and similar symbols.

In some example embodiments, the scanning apparatus 102 may be a wearable device and may include one or more I/O ports. In further example embodiments, the scanning apparatus 102 may include at least two I/O ports where each of the I/O ports are positioned on opposite sides of the scanning apparatus 102. In such an example, a first I/O port 104a may be on a first side of the scanning apparatus 102 whereas a second, I/O port may be on a second side of the scanning apparatus 102. In some examples, the first side is opposite to the second side. In other examples, additional I/O ports may be used or otherwise placed in the same and/or alternate positions.

As illustrated, the scanning apparatus 102 comprises an apparatus chassis for housing the various components of the apparatus. In this regard, it should be appreciated that the apparatus chassis may be embodied in any of a myriad of chassis designs, using any of a myriad of materials, and/or the like, suitable to position the various components of the scanning apparatus 102 for operation. In at least one example context, the scanning apparatus 102 may be embodied as a handheld apparatus chassis, wearable chassis, and/or the like.

One example embodiment of the scanning apparatus 102 is illustrated in FIG. 2, details of which will be described in the subsequent portions of the disclosure.

FIG. 2 illustrates an example scanning apparatus in accordance with at least one example embodiment of the present disclosure. Specifically, as illustrated, the scanning apparatus is embodied by a scanning apparatus 202. In some examples, the scanning apparatus may take the form of scanning apparatus 102, which is shown with respect to FIGS. 1A and 1B. The scanning apparatus 202 includes, in some examples, a plurality of cameras, which in some examples may comprise a near-field imager and a far-field imager, configured for capturing image data objects in a field of view whereas in other examples the cameras may comprise a front camera and a back camera. In at least one example context, the scanning apparatus 202 is configured for capturing images for purposes of barcode reading at different ranges, in different directions, and/or the like.

It will be appreciated that although FIG. 2 is depicted and described with respect to a multi-camera embodiment, in other embodiments scanning apparatus 202 may include a single camera and/or a single illuminator. Alternatively, some embodiments include a single illuminator and a plurality of camera, or alternatively a single camera and a plurality of illuminators. In this regard, it should be appreciated that the particular cameras, arrangement of cameras, and/or arrangement of illuminators described herein should not limit the scope and spirit of this disclosure or the claims appended hereto.

In some embodiments, the scanning apparatus 202 includes one or more processing components (e.g., a microcontroller, a processor, and/or other processing circuitry), such as processor 204, for controlling and/or operating one or more cameras, operating the scanning apparatus 202, and controlling and/or operating the one or more I/O ports (e.g., first I/O port 218 and second I/O port 220) to communicate with or otherwise control the one or more connected devices, such as upstream or downstream devices. For example, in at least one example embodiment, the scanning apparatus 202 includes a processor 204 configured for activating/de-activating one or more communications path, such as the bypass communication path and/or hub communication path to operate and/or otherwise communicate with one or more connected devices. In some such contexts, the processor 204 is embodied by any one of a myriad of processing circuitry implementations, for example as a FPGA, ASIC, microprocessor, microcontroller, CPU, and/or the like. In at least some embodiments, the processor may be in communication with one or more memory device(s), such as memory 206, having computer-coded instructions enabling such functionality when executed by the processor(s). In some embodiments, it should be appreciated that the processor may include one or more sub-processors, remote processors (e.g., "cloud" processors) and/or the like, and/or may be in communication with one or more additional processors for performing such functionality.

In at least one example embodiment, the processor 204 is configured to provide functionality for operating one or more components of the scanning apparatus 202. For example, the processor 204 may be configured for activating the first camera 212, the second camera 214, the bypass circuitry 216, and/or communicating with or otherwise controlling directly or indirectly the first I/O port 218 and/or the second I/O port 220. Additionally or alternatively, in some embodiments, the processor 202 is configured for activating the first camera 212 and/or the second camera 214 to capture image date and read the captured data to generate an image based on the data captured. Additionally or alternatively, in some embodiments, the processor 204 is configured to process the captured image(s), for example based on one or more image processing task(s). In one such example context, the processor 204 is configured to attempt to detect and decode visual indicia(s), such as 1D and/or 2D barcodes, from a captured image. In this regard, the processor 204 may be configured to utilize a visual indicia parsing algorithm and/or a visual indicia decoding algorithm to provide such functionality.

Additionally or alternatively, optionally in at least some embodiments, the scanning apparatus 202 further includes a memory 206. The memory 206 may provide storage functionality, for example to store data processed by the scanning apparatus 202 and/or instructions for providing the functionality described herein. In some embodiments, the processor 204 may be in communication with the memory 206 via a bus for passing information among components of the apparatus, and/or for retrieving instructions for execution. The memory 206 may be non-transitory and may include, for example, one or more volatile and/or non-volatile memories. In other words, for example, the memory 206 may be an electronic storage device (e.g. a computer readable storage medium). The memory 206 may be configured to store information, data, content, applications, instructions, or the like, for enabling the scanning apparatus 202 to carry out various functions in accordance with example embodiments of the present disclosure. In some embodiments, the memory 206 includes computer-coded instructions for execution by the processor 204, for example to execute the functionality described herein and/or in conjunction with hard-coded functionality executed via the processor 204. For example, when the processor 204 is embodied as an executor of software instructions, the instructions may specially configure the processor 204 to perform the algorithms and/or operations described herein when the instructions are executed.

Additionally or alternatively, optionally in at least some embodiments, the scanning apparatus 202 further includes activation component 208. The activation component 208 may include hardware, software, firmware, and/or a combination thereof, configured to indicate initiation (and/or termination) of desired functionality by the user. For example, the activation component 208 may transmit an activation signal to cause the processor 204 to capture image(s) via the first camera 212 and/or the second camera 214. In some embodiments, the activation component 208 is embodied by one or more buttons, triggers, and/or other physical components on the body of the scanning apparatus chassis. For example, in at least one example context, the activation component 208 is embodied by one or more "trigger" components that, when engaged by an operator (e.g., when an operator squeezes the trigger), transmits a signal to the processor 204 to initiate corresponding functionality. Alternatively or additionally, in at least some embodiments, the activation component 208 is embodied without any components for direct engagement by an operator. For example, the activation component 208 may be embodied by hardware and/or software, or a combination thereof, for detecting the scanning apparatus 202 being raised and/or positioned to a predefined "scanning" position, and/or lowered from that position to trigger deactivation.

Additionally or alternatively, optionally in at least some embodiments, the scanning apparatus 202 further includes a display 210. The display 210 may be embodied by a LCD, LED, and/or other screen device configured for data provided by one or more components of the scanning apparatus 202. For example, in some embodiments, the display 210 is configured for rendering a user interface comprising text, images, control elements, and/or other data provided by the processor 204 for rendering. In some embodiments, for example, the display 210 is embodied by a LCD and/or LED monitor integrated with the surface of the apparatus chassis and visible to an operator, for example to provide information decoded from a barcode and/or associated with such information decoded from a barcode. In one or more embodiments, the display 210 may be configured to receive user engagement, and/or may transmit one or more corresponding signals to the processor 210 to trigger functionality based on the user or operator engagement. In some such embodiments, the display 210 to provide user interface functionality embodying activation component 208, for example to enable an operator to initiate and/or terminate scanning functionality via interaction with the user interface.

In some examples, the scanning apparatus 202 includes a first camera 212. The first camera 212 may include one or more lens(es) and/or other optical components configured to enable light to transverse through and interact with a corresponding image sensor. In this regard, the first camera 212 may define a first field of view that may be captured.

In some examples, the scanning apparatus 202 includes a second camera 214. The second camera 214 may include one or more lens(es) and/or other optical components configured to enable light to transverse through and interact with a corresponding image sensor. In this regard, the second camera 214 may define a second field of view. In some examples, the first camera 212 may be a front camera and the second camera 214 may be a rear camera.

In some embodiments, the first field of view is wider than the second field of view. In other examples, the first field of view may be narrower than the second field of view and focused on a further range to enable clearer capture of objects located at a greater range than objects that can be captured clearly in the near field of view. In yet further examples, the first field of view and the second field of view may be offset, may be in opposite directions, may overlap, and/or the like.

In some examples, the first camera 212 and/or the second camera 214 comprises image capture optics. The image capture optics may be embodied by one or more lens(es) and/or other optical components configured to enable light to transverse through and interact with a corresponding image sensor, for example the image sensor. The image sensor may include an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID, CMD, back-illuminated technologies. The image sensor may be either a progressive or interleaved imager. The image sensor may contain an array of light sensitive photodiodes (or pixels) that convert incident light energy into electric charge. An exemplary image sensor may use a mono color image sensor that may include a filter element defining color sensitive pixel elements dispersed throughout an array of monochrome pixels. An exemplary image sensor may include an image sensor processor, an analog to digital converter (ADC) and other circuitry. In some example embodiments, the image sensor may include a global shutter to provide enhanced motion tolerance In some embodiments, each camera is associated with one or more components for projecting an illumination configured for illuminating the field of view defined by the camera. Additionally or alternatively, optionally in some embodiments, the scanning apparatus further comprises an aimer. In some examples, the aimer and/or the illumination components comprise one or more laser diodes and/or high intensity LED(s) configured to produce sufficiently powerful and/or concentrated light. In one example context, for purposes of barcode scanning for example, the aimer may project an aimer pattern as a laser line pattern.

It should be appreciated that, in other embodiments, the scanning apparatus 202 may include any number of image capture optics, image sensors, light sources, and/or any combination thereof. In this regard, the engine may be extended to capture any number of field of views, which may each be associated with a corresponding illuminator designed for specifically illuminating a corresponding field of view. One or more of the light source(s) may negatively affect operation of another illuminator. In such circumstances, when one such light source is active, the negatively affected image sensor may be activated between illumination pulses of the light source as described herein. Such operation may be implemented for any combination(s) of light source and image sensor.

In some embodiments, the scanning apparatus 202 further includes input/output ("I/O") ports, such as a first I/O port 218 and/or a second, I/O port 220. The first I/O port 218 and the second I/O port 220 may be in communication with processor 204 to provide an output to a connected device and/or, in some embodiments, to receive an input from a connected device. In some examples, the first I/O port 218 and the second I/O port 220 are configured to enable or other allow for communication with one or more upstream USB hosts and/or one or more downstream peripherals. In some examples, the first I/O port 218 and the second I/O port 220 may be configured to operate according to the USB data communication protocol whereas in other examples other data communications protocols may be used.

In some examples, the first I/O port 218 and the second I/O port 220 are configured in a five pin pogo arrangement. In such examples, one or more pins may be used to communicate with a connected device. In other examples, one or more of the pins may be monitored and/or otherwise measured to detect a connected device.

In some examples, a first pin may take the form of a VBUS and carry a nominal 5V supply. In other examples, one or more pins may take the form of an USB on the go ("OTG") adaptor (e.g., a first pin for data positive and a second pin for data negative). In yet further examples, another pin may take the form of a ground. In yet further examples, a pin may take the form of an identification pin. In such examples, a voltage can be measured with respect to the identification pin and the measured or reference voltage may be used to identify a connected device, such as by a lookup table, by a trained machine learning model, and/or the like.

In some examples, the scanning apparatus 202 may be configured to modify or otherwise enable a VBUS power path based on a connected device(s). For example, in an instance in which a downstream peripheral (e.g., ring scanner, headset, or keyboard) is attached, a power management integrated circuit (PMIC) is used to manage power on the downstream peripheral. In some cases, voltage may change based on the detected device. In another example, in an instance in which an upstream USB host (e.g., a home base or the like) is attached, the VBUS power path may allow for input power for charging. In some examples, a VBUS power path may be established based on a detected connection, such as the detected connection described with respect to at least FIG. 4.

In some embodiments, the scanning apparatus 202 further includes bypass circuitry. In some examples, the bypass circuitry is configured to be in the communications path between the processor and the first I/O port 218 and the second I/O port 220 and is configured to control one or more communications pathways based on a detected or otherwise identified connected device (e.g., am upstream USB hub or a downstream peripheral). Additional description with respect to bypass circuitry is described with respect to FIG. 3.

FIG. 3 illustrates example bypass circuitry in accordance with at least one example embodiment of the present disclosure. Example bypass circuitry 216 comprises, in some examples, a USB mode selector 302, a USB hub 304, a USB port selector 306, and a USB controller, such as USB port controller right 308 and a USB port controller left 310. As is described herein, example bypass circuitry 216 enables or otherwise supports one or more communication pathways between processor 204 and a connected device attached or otherwise in communication with the first I/O port 218 and the second I/O port 220.

USB mode selector 302 comprises circuitry configured to select a communications pathway based on an input signal from the processor 204. In one example, the USB mode selector 302 is configured to receive a signal from the processor 204 with respect to a communication path, such as a bypass communication path. In an instance in which a signal from the processor 204 indicates a bypass communication path, USB mode selector 302 is configured to communicate with the USB port selector 306 (via a bypass communication path as is indicated by a dashed line). In an instance in which a signal from the processor 204 is not received or in an instance in which a signal from the processor 204 indicates a hub communication path, USB mode selector 302 is configured to communicate with the USB hub 304 (via a hub communication path as is indicated by a solid line).

USB hub 304 is, in some examples, circuitry that may take the form of an integrated multi-port hub that enables multiple concurrent USB connections. In some examples, USB hub 304 may take the form of or attach to an upstream port as a hub and/or support one or more connected devices via downstream ports. In some examples, USB hub 304 is configured, when operated via a hub communication path, to communicate with or otherwise control one or more connected devices via the USB port controllers and I/O ports. In some examples, USB hub 304 is configured to communicate with a USB controller, such as USB port controller right 308 and a USB port controller left 310 (via a hub communication path as is indicated by a solid line). In some examples, the hub communication path is configured to communicate with or otherwise control one or more connected devices, such as connected downstream peripherals. Alternatively or additionally, the hub communication path can be used for upstream and/or downstream connections in some examples.

USB port selector 306, in some examples, comprises circuitry configured to communicate with the processor 204 via the USB selector 302 over the bypass communication path (dashed line). In some examples, the USB port selector 306, is configured, in an instance in which the bypass communication path is activated, to communicate with one of the first I/O port 218 and the second I/O port 220 based on whether a USB host is detected. That is, and in some examples, the USB selector 306 is configured to enable the bypass communication path to the I/O port having the upstream USB host connected thereto and disconnect the other I/O port. In such examples, the USB selector 306 enables the processor 204 to connect to and/or communicate with an upstream USB host by bypassing USB host 304. As a result, USB port selector 306 is configured to communicate with a USB controller, such as USB port controller right 308 or USB port controller left 310 (via a bypass communication path as is indicated by a dashed line).

In some examples, USB port selector 306 may be configured to bypass or otherwise disable USB hub 304. Alternatively or additionally, processor 204 may be configured to bypass or otherwise disable USB hub 304.

In some examples, a USB controller, such as USB port controller right 308 and a USB port controller left 310, is configured to control and/or otherwise communicate with the first I/O port 218 and the second I/O port 220, respectively. In some examples, USB port controller right 308 and a USB port controller left 310 comprise circuitry that takes the form of USB High-Speed (HS) signal conditioner, designed to compensate for ISI signal loss in a transmission channel. In further examples, USB port controller right 308 and a USB port controller left 310 support USB On-The-Go (OTG) and Battery Charging (BC) protocols.

In some examples, USB port controller right 308 and USB port controller left 310 are configured to communicate via an active communication path, such as the bypass communication path and/or the hub communication path. In this way and in some examples, USB port controller right 308 and a USB port controller left 310 communicate with the USB hub via the hub communication path (solid line) and communicate with the USB port selector 306 via the bypass communication path (dashed line).

In some examples, bypass circuitry 216 may be operated in accordance with one or more processes based on a detected connected device. Additional disclosure with respect to the operation of bypass circuitry 216, processor 204, and scanning apparatus 202 is described with respect to FIGS. 4-7.

Example Processes of the Disclosure

Having described example components, apparatuses, sub-assemblies, and properties of the scanner apparatus of the disclosure, example flowcharts including various operations performed by the above-described apparatus(es) will now be discussed. It should be appreciated that each of the flowcharts depicts an example processes that may be performed by one or more components of the above-described apparatuses, for example any of the apparatuses depicted and/or described in FIGS. 1A, 1B, 2, and/or 3. The blocked operations of each process may be arranged in any of a number of ways, as depicted and described herein. In some embodiments one or more operations of a first process may occur in-between one or more operations, or otherwise operate as a sub-process, of a second process. Additionally or alternatively, the process may include some or all of the steps described and/or depicted, including one or more optional operations in some embodiments. In regards to the below described flowcharts, one or more of the depicted operations may be optional in some, or all, embodiments of the present disclosure. Similarly, it should be appreciated that one or more of the operations of each flowcharts may be combinable, replaceable, and/or otherwise altered as described herein.

FIG. 4 illustrates an example process 400 for determining at least one device is connected to an I/O port, in accordance with at least one example embodiment of the present disclosure. In this regard, the example process 400 may be performed by one or more specially configured apparatuses, such as the scanning apparatus 202. In this regard, in some such embodiments, the scanning apparatus 202 may be configured to perform one or more of the operations described herein utilizing one or more of the components therein, such as the processor 204, memory 206, the bypass circuitry 216, the first I/O port 218, and/or the second I/O port 220. In some such embodiments, the scanning apparatus 202 is configured for performing one or more of the operations as depicted and described by executing computer program instructions stored therein, for example in the memory 206.

At operation 402, the process 400, in some examples, detects a connection to at least one of the first input/output port and the second input/output port. In some examples and based on at least one pin connection at the first I/O port 218 and/or the second I/O port 220, a connected device may be detected. In some examples, the detection may be based on a sensed voltage, a physical indication of a connected device, a user indication of a connected device, and/or the like. For example, to detect the presence of a connected device one or more pins may be measured at an I/O port.

In an example where a reference voltage of a ID pin at an I/O port is measured and the voltage is determined to be floating, nothing is connected to the I/O Port. In another example and when the voltage of the ID pin is pulled low or voltage is applied, the process 400 detects a connection of a connected device (e.g., a downstream USB scanner, a downstream USB keypad, or an upstream USB host). In some examples and as described with respect to FIG. 5, in an instance in which a connected device is detected, the connected device may be identified as a connected device, such as a downstream peripheral or an upstream USB host, in some examples.

At operation 404, the process 400, in an instance in which a downstream peripheral is detected, communicates with the downstream peripheral via a hub communication path. In some examples and in an instance in which a downstream peripheral is detected, scanning apparatus 202 functions as a host device. Alternatively or additionally, in some examples, the hub mode of operation may be enabled in an instance in which a downstream peripheral is attached to each of the I/O ports. In such an example, the bypass mode of operation may be used if, for example, a downstream peripheral is attached to a first I/O port and there is nothing connected to a second I/O port.

As is further disclosed with respect to FIG. 7, in an instance in which a downstream peripheral is detected, the hub communication path (e.g., FIG. 3., solid line) and the USB hub (e.g., USB hub 304) is used to control or otherwise communicate with the one or more downstream peripherals.

At operation 406, the process 400, in an instance in which a USB host is detected, communicates with the USB host (e.g., a charge communication based or personal computer) via a bypass communication path. In some examples and in an instance in which a USB host is detected, scanning apparatus 202 functions as a client device.

As is further disclosed with respect to FIG. 6 in an instance in which a USB host is detected, the bypass communication path (e.g., FIG. 3., dashed line) is used to control or otherwise communicate with an upstream USB host. As described herein, the bypass communication path is configured to bypass the integrated USB host. In some examples and in an instance in which an upstream USB host is connected to a I/O port, all other I/O ports are disconnected.

FIG. 5 illustrates an example process 500 for identifying the type or classification of the at least one device that is connected to an I/O port, in accordance with at least one example embodiment of the present disclosure. In this regard, the example process 500 may be performed by one or more specially configured apparatuses, such as the scanning apparatus 202. In this regard, in some such embodiments, the scanning apparatus 202 may be configured to perform one or more of the operations described herein utilizing one or more of the components therein, such as the processor 204, memory 206, the bypass circuitry 216, the first I/O port 218, and/or the second I/O port 220. In some such embodiments, the scanning apparatus 202 is configured for performing one or more of the operations as depicted and described by executing computer program instructions stored therein, for example in the memory 206.

At operation 502, the process 500 analyzes at least one pin to determine a reference voltage. In some examples, each of the I/O ports may comprise one or more pins, such as pins on a POGO connector. In such examples, a pin may provide an indication of a connection (e.g., a peripheral attached to an I/O port may pull the ID pin (e.g., an identification pin or other predetermined pin configured for identification of a connected device) low through a 5.1 kΩ resistor or smaller to indicate connection) based on a voltage applied, a voltage pulled low, and/or the like. In other examples, an ID pin may be used to identify an attached device via means such as analyzing an a signal that comprises an identification code and/or the like.

At operation 504, the process 500 determines that the reference voltage is pulled low such as via a resistor and sets the detected device as a downstream peripheral or USB client device. In such examples, the fact that voltage is pulled low may be indicative of a connected downstream peripheral. In other examples, voltage measurement may be used to detect a specific type of downstream peripheral or to determine a connected upstream USB host. Whereas in other examples where voltage is applied, the process 500 analyzes the voltage level to determine or otherwise identify the connected device.

At operation 506, the process 500, in an instance in which the detected reference voltage is an applied voltage and satisfies a first range (e.g., a range of voltage values that have been identified as corresponding to a particular connected device or connected devices), sets the detected device as a downstream peripheral. At operation 508, the process 500, in an instance in which the detected reference voltage is an applied voltage and satisfies a second range (e.g., a range of voltage values that have been identified as corresponding to a particular connected device or connected devices), sets the detected device as a USB host.

In some examples, each device that may be connected may have a specific voltage range that has been identified by or otherwise provided to the scanning apparatus. In some examples, the voltage ranges may be provided by a lookup table. In such examples, in an instance in which an applied voltage is within a range, the USB mode and/or accessory type is identified and may be set via operations 506 and/or 508. One such example lookup table is shown in the table below:

| USB Mode | Accessory type | Voltage range |
|---|---|---|
| Client | Upstream USB Host | 1.30 V-1.66 V |
| Host | Downstream Peripheral | 1.06 V-1.30 V |
| Client | Upstream USB Host | 0.68 V-1.06 V |
| Host | Downstream Peripheral | 0.56 V-0.68 V |
| Host | Downstream Peripheral | 0.32 V-0.56 V |

The above examples are to be viewed as examples and other ranges are contemplated. For example, in some cases, upstream USB hosts may be detected based on a voltage range of 1.5V or higher, 10.04V or higher, and/or the like. Similarly, downstream peripherals may be detected bases on a voltage range of 1.45V or lower, 0.94V or lower, and/or the like. In yet other examples, a particular accessory type, such as a downstream USB scanner, a downstream USB keypad, and/or the like may be specifically identified. Other mechanisms, such as machine learning, user intervention, data communications with the connected device, and/or the like may be used when determining the identity of a connected device.

FIG. 6 illustrates an example process 600 for connecting a bypass communication path, in accordance with at least one example embodiment of the present disclosure. In this regard, the example process 600 may be performed by one or more specially configured apparatuses, such as the scanning apparatus 202. In this regard, in some such embodiments, the scanning apparatus 202 may be configured to perform one or more of the operations described herein utilizing one or more of the components therein, such as the processor 204, memory 206, the bypass circuitry 216, the first I/O port 218, and/or the second I/O port 220. In some such embodiments, the scanning apparatus 202 is configured for performing one or more of the operations as depicted and described by executing computer program instructions stored therein, for example in the memory 206.

At operation 602, the process 600 activates a USB mode selector to a bypass mode of operation. In such an example, the USB mode selector is configured to operate in either a bypass mode of operation or a hub mode of operation. In the bypass mode of operation, the USB mode selector is configured to bypass the integrated USB hub by communicating with at least one connected device via a bypass communication path, such as the bypass communication path described with respect to FIG. 3. In the hub mode of operation the USB mode selector is configured to communicate with at least one connected device via a hub communication path, such as the hub communication path described with respect to FIG. 3.

At operation 604, the process 600 connects a bypass communication path between the USB Mode Selector and the USB Port Selector. As was described with respect to the dashed line in FIG. 3, a bypass communication path is established between the USB Mode Selector and the USB Port Selector so as to allow the processor 204 to bypass the USB hub, in some examples.

At operation 606, the process 600 determines that the USB host is connected to a first I/O port. In some examples and when connected or otherwise communicating with an upstream USB device, a single I/O port is connected to an upstream USB host. In some examples, other devices may be connected to other I/O ports. Indeed and in alternative or additional embodiments, a single downstream peripheral may be attached and may be in communication with the processor via a bypass communication path.

At operation 608, the process 600, based on the connected first I/O port, establishes a connection path, such as the bypass communication path, between the USB Port Selector and the first I/O port via a corresponding USB port controller. In some examples and in an instance in which the USB host is connected to the first I/O port, than a connection, via the bypass communication path, may be established with the corresponding USB controller, such as USB controller right 308.

At operation 610, the process 600 disconnects a second I/O port. In some examples and as was described at operation 606, the process 600 determines or otherwise identifies which I/O port has a connected upstream host and connects to a corresponding USB port controller. In some examples, only one upstream USB host may be connected to the scanning apparatus 202 and other I/O ports are disconnected. That is, when an upstream USB host is connected to a first I/O port all other ports are disconnected and any corresponding connected devices are likewise disconnected.

FIG. 7 illustrates an example process 700 for connecting a hub communication path, in accordance with at least one example embodiment of the present disclosure. In this regard, the example process 700 may be performed by one or more specially configured apparatuses, such as the scanning apparatus 202. In this regard, in some such embodiments, the scanning apparatus 202 may be configured to perform one or more of the operations described herein utilizing one or more of the components therein, such as the processor 204, memory 206, the bypass circuitry 216, the first I/O port 218, and/or the second I/O port 220. In some such embodiments, the scanning apparatus 202 is configured for performing one or more of the operations as depicted and described by executing computer program instructions stored therein, for example in the memory 206.

At operation 702, the process 700 activates a USB Mode Selector to a hub mode of operation. In some examples, a hub mode of operation is enabled in an instance in which a downstream peripheral is connected. Alternatively or additionally, the hub mode of operation is enabled in an instance in which a plurality of downstream peripherals are connected In such cases, a USB hub, such as the USB hub described herein, is used to communicate with or otherwise control the connected downstream peripheral.

At operation 704, the process 700 connects a hub communication path between the USB Mode Selector and the USB Hub. As is described herein and in an instance in which a downstream peripheral is attached, a hub communications path is used so as to allow the USB hub to control or otherwise communicate with a plurality of connected downstream peripherals.

At operation 706, the process 700 connects the USB hub to at least one of the first I/O Port and the second I/O port based on the detection of a connected downstream peripheral. In such examples, the USB hub is connected to one or more I/O ports via a USB port controller. As is described herein, one or more downstream peripherals may be connected and operated in parallel in a hub mode of operation.

CONCLUSION

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "processor" or "data processing apparatus" encompasses all kinds of apparatus, devices, and machines for processing data, including by way of example a programmable processor, a computer, a system on a chip, a microcontroller, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising:
    at least one processor;
    a universal serial bus ("USB") hub communicatively coupled with the at least one processor; and
    at least one memory including computer program code, the at least one memory and the computer program code configured to, with the at least one processor, cause the apparatus to at least:
        detect a connection to at least one of a first input/output port and a second input/output port with a device;
        in an instance in which a downstream peripheral is detected as being connected to the at least one of the first input/output port and the second input/output port, communicate, via the USB hub, with the downstream peripheral via a hub communication path; and
        in an instance in which a USB host is detected as being connected to the at least one of the first input/output port and the second input/output port, communicate with the USB host via a bypass communication path, wherein the bypass communication path bypasses the USB hub and the hub communication path.

2. The apparatus according to claim 1, wherein the at least one memory including the computer program code is further configured to, with the at least one processor, cause the apparatus to:
    analyze at least one pin on the at least one of the first input/output port and the second input/output port to determine a reference voltage; and
    select at least one the downstream peripheral and the USB host based on the reference voltage.

3. The apparatus according to claim 2, wherein the at least one memory including the computer program code is further configured to, with the at least one processor, cause the apparatus to:
    determine that the reference voltage is pulled low; and
    set the device as a downstream peripheral.

4. The apparatus according to claim 2, wherein the at least one memory including the computer program code is further configured to, with the at least one processor, cause the apparatus to:
    in an instance in which the determined reference voltage is an applied voltage and satisfies a first range, setting the device as a downstream peripheral; and
    in an instance in which the determined reference voltage is an applied voltage and satisfies a second range, setting the device as a USB host.

5. The apparatus according to claim 2, wherein the at least one memory including the computer program code is further configured to, with the at least one processor, cause the apparatus to:
    determine that the reference voltage is floating; and
    determine that nothing is connected to the at least one of the first input/output port and the second input/output port.

6. The apparatus according to claim 1, further comprising a USB mode selector, wherein the at least one memory including the computer program code is further configured to, with the at least one processor, cause the apparatus to:
    activate the USB mode selector to a USB host mode of operation;
    connect the bypass communication path between the USB mode selector and a USB port selector so as to enable communication with the at least one of the first input/output port and the second input/output port via the bypass communication path.

7. The apparatus according to claim 6, wherein the at least one memory including the computer program code is further configured to, with the at least one processor, cause the apparatus to:
    determine that the USB host is connected to the first input/output port;
    based on the connected first input/output port, establishing a connection path between the USB port selector and the first input/output port via a corresponding USB port controller; and
    disconnecting the second input/output port, wherein the path between the USB port selector and the first input/output port corresponds to the bypass communication path.

8. The apparatus according to claim 1, wherein the at least one memory including the computer program code is further configured to, with the at least one processor, cause the apparatus to:
    activate a USB mode selector to a downstream peripheral mode of operation;

connect the hub communication path between the USB mode selector and the USB hub; and connect the USB hub to at least one of the first input/output port and the second input/output port based on the detection of a connected downstream peripheral.

9. A computer-implemented method comprising:

detecting a connection to at least one of a first input/output port and a second input/output port with a device;

in an instance in which a downstream peripheral is detected as being connected to the at least one of the first input/output port and the second input/output port, communicating, via a universal serial bus ("USB") hub, with the downstream peripheral via a hub communication path; and in an instance in which a USB host is detected as being connected to the at least one of the first input/output port and the second input/output port, communicating with the USB host via a bypass communication path, wherein the bypass communication path bypasses the USB hub and the hub communication path.

10. The computer-implemented method according to claim 9, wherein detecting a connection to at least one of a first input/output port and a second input/output port further comprises:

analyzing at least one pin on the at least one of the first input/output port and the second input/output port to determine a reference voltage; and selecting at least one the downstream peripheral and the USB host based on the reference voltage.

11. The computer-implemented method according to claim 10, further comprising:

determining that the reference voltage is pulled low; and setting the device as a downstream peripheral.

12. The computer-implemented method according to claim 10, further comprising:

in an instance in which the determined reference voltage is an applied voltage and satisfies a first range, setting the device as a downstream peripheral; and in an instance in which the determined reference voltage is an applied voltage and satisfies a second range, setting the device as a USB host.

13. The computer-implemented method according to claim 10, further comprising:

determining that the reference voltage is floating; and determining that nothing is connected to the at least one of the first input/output port and the second input/output port.

14. The computer-implemented method according to claim 9, wherein communicating with the USB host via the bypass communication path further comprises:

activating a USB mode selector to a USB host mode of operation;

connecting the bypass communication path between the USB mode selector and a USB port selector so as to enable communication with the at least one of the first input/output port and the second input/output port via the bypass communication path.

15. The computer-implemented method according to claim 14, further comprising:

determining that the USB host is connected to the first input/output port;

based on the connected first input/output port, establishing a connection path between the USB port selector and the first input/output port via a corresponding USB port controller; and disconnecting the second input/output port.

16. The computer-implemented method according to claim 9, wherein communicating with the downstream peripheral via the hub communication path further comprises:

activating a USB mode selector to a downstream peripheral mode of operation;

connecting the hub communication path between the USB mode selector and the USB hub; and connecting the USB hub to at least one of the first input/output port and the second input/output port based on the detection of a connected downstream peripheral.

17. A computer program product comprising at least one non-transitory computer-readable storage medium having computer-readable program code portions stored therein, the computer-readable program code portions comprising an executable portion configured to:

detect a connection to at least one of a first input/output port and a second input/output port with a device;

in an instance in which a downstream peripheral is detected as being connected to the at least one of the first input/output port and the second input/output port, communicate, via a universal serial bus ("USB") hub, with the downstream peripheral via a hub communication path; and in an instance in which a USB host is detected as being connected to the at least one of the first input/output port and the second input/output port, communicate with the USB host via a bypass communication path, wherein the bypass communication path bypasses the USB hub and the hub communication path.

18. The computer program product according to claim 17, wherein the computer-readable program code portions comprising the executable portion are configured to:

analyze at least one pin on the at least one of the first input/output port and the second input/output port to determine a reference voltage; and select at least one the downstream peripheral and the USB host based on the reference voltage.

19. The computer program product according to claim 18, wherein the computer-readable program code portions comprising the executable portion are configured to:

in an instance in which the reference voltage is pulled low, set the device as a downstream peripheral;

in an instance in which the determined reference voltage is an applied voltage and satisfies a first range, set the device as a downstream peripheral; and in an instance in which the determined reference voltage is an applied voltage and satisfies a second range, set the device as a USB host.

20. The computer program product according to claim 17, wherein the computer-readable program code portions comprising the executable portion are configured to:

activate a USB mode selector to a USB host mode of operation;

connect the bypass communication path between the USB mode selector and a USB port selector so as to enable communication with the at least one of the first input/output port and the second input/output port via the bypass communication path.

* * * * *